(12) United States Patent
Lauzier et al.

(10) Patent No.: US 8,601,897 B2
(45) Date of Patent: Dec. 10, 2013

(54) FORCE LIMITING DEVICE AND METHOD

(75) Inventors: Nicolas Lauzier, Quebec (CA);
Clement Gosselin, Quebec (CA);
Dalong Gao, Troy, MI (US); Martin Grenier, Quebec (CA); Robin Stevenson, Bloomfield, MI (US)

(73) Assignees: GM Global Technology Operations LLC, Detroit, MI (US); Universite Laval, Quebec (CA)

( * ) Notice: Subject to any disclaimer, the term of this patent is extended or adjusted under 35 U.S.C. 154(b) by 409 days.

(21) Appl. No.: 12/627,407

(22) Filed: Nov. 30, 2009

(65) Prior Publication Data

US 2011/0126660 A1     Jun. 2, 2011

(51) Int. Cl.
*B25J 19/06* (2006.01)

(52) U.S. Cl.
USPC .......................................... 74/490.01; 901/49

(58) Field of Classification Search
USPC ............. 74/490.01, 490.05; 414/917; 901/49, 901/50; 33/503
See application file for complete search history.

(56) References Cited

U.S. PATENT DOCUMENTS

| | | | |
|---|---|---|---|
| 5,577,414 A * | 11/1996 | Ogawa et al. | 74/490.03 |
| 6,516,681 B1 * | 2/2003 | Pierrot et al. | 74/490.01 |
| 6,987,374 B2 * | 1/2006 | Iribe et al. | 318/568.12 |
| 7,301,117 B2 * | 11/2007 | Wiedemann et al. | 219/86.51 |
| 7,503,125 B2 * | 3/2009 | Jordil et al. | 33/503 |
| 2004/0128850 A1 | 7/2004 | Joo | |
| 2008/0141813 A1* | 6/2008 | Ehrat | 74/490.01 |
| 2009/0255363 A1 | 10/2009 | Nishida et al. | |

FOREIGN PATENT DOCUMENTS

| | | |
|---|---|---|
| DE | 3620391 A1 | 12/1987 |
| DE | 29607680 U1 | 6/1996 |
| DE | 102007004166 A1 | 8/2008 |

* cited by examiner

*Primary Examiner* — David M Fenstermacher
*Assistant Examiner* — Terence Boes
(74) *Attorney, Agent, or Firm* — Quinn Law Group, PLLC

(57) ABSTRACT

The present invention relates to a method and apparatus for limiting the contact force between a moving device and another object, using a parallel mechanism and torque limiters where the threshold force to activate the force limiting mechanism is not related to the configuration of the moving device or the location of the contact force relative to the activation point of the force limiting mechanism, and where the mechanism may be configured for one, two or three degrees of freedom. A counterbalance mechanism is also provided to counteract gravity load when the force limiting mechanism is configured for three degrees of freedom and responsive to contact forces including a vertical element. In particular, the invention relates to a method and apparatus for limiting the contact force between a moving robotic device and a contactable object.

14 Claims, 5 Drawing Sheets

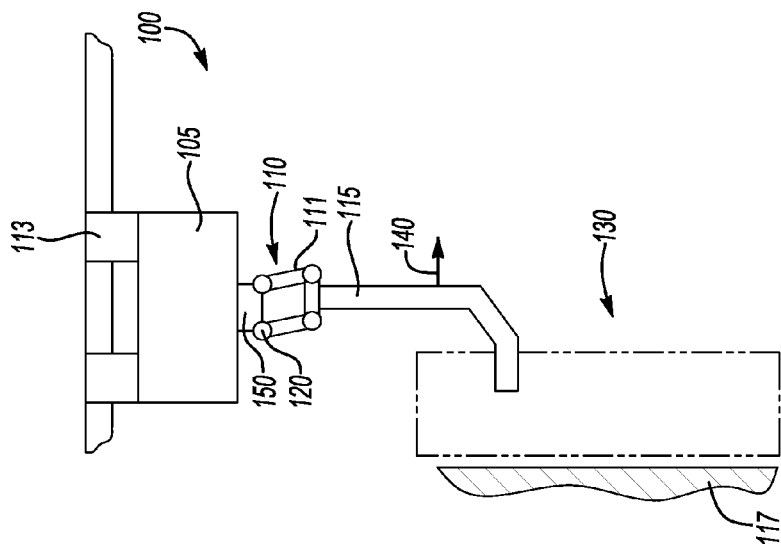
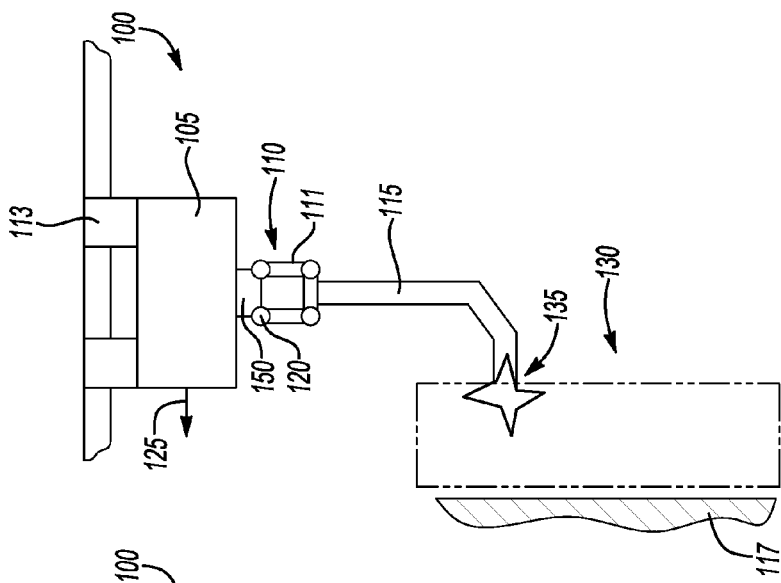
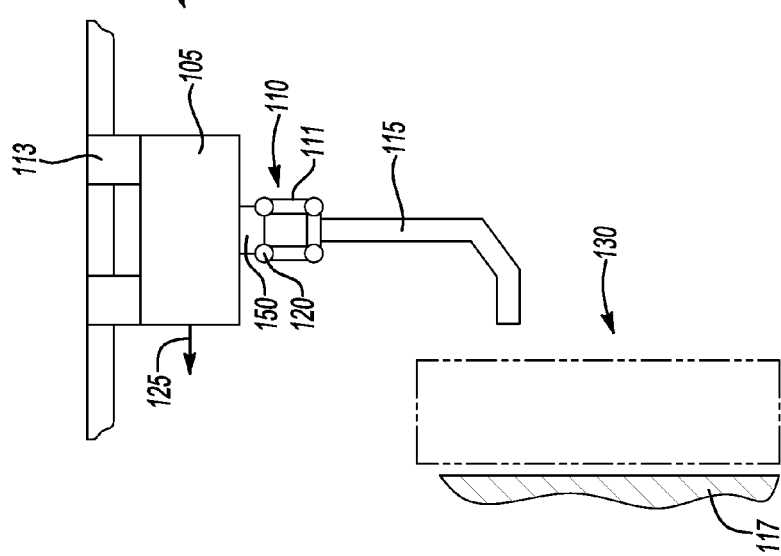

FORCE LIMITING DEVICE AND METHOD

TECHNICAL FIELD

The present invention relates to a method and apparatus for limiting the force between a moving device and another object, using a parallel mechanism and torque limiters where the threshold force is not related to the device configuration, and in particular to limiting the collision or impact force between a moving robotic device and a contactable object.

BACKGROUND OF THE INVENTION

The use of industrial robots is well established in applications where the robots are in controlled environments where they are separated by fences or cages. A collision between a robot and a contacted object is a complex situation, where one of the most severe situations is when a collision with clamping occurs, entrapping the contacted object between the contacting portion of the robot and a static fixture, such as a wall. In this case, the severity of the collision may be indexed using the maximum contact force, which can then be used as a reference for unexpected collisions during the design process.

Control and dependability are characteristics needed from a robot to allow it to interact in a minimally controlled, e.g., unfenced and uncaged, environment with other objects, which may be moving or stationary. Roboticists may typically use three different strategies to develop these characteristics. First, roboticists may develop algorithms that use vision systems, proximity sensors or the like to anticipate and avoid potentially harmful contacts between robots and objects. Secondly, methods may be developed to detect a collision by monitoring joint torques or a robot skin and to quickly react to manage the contact forces under a certain level. Thirdly, roboticists pursue robot designs that will intrinsically prevent damaging contact.

Avoidance, reaction and design strategies can be combined together to improve robot design. However, the first two options alone may not fully guarantee the desired result. Consider that a robot intended to interact physically with a contactable object will require the ability to distinguish desirable and undesirable contacts, e.g., good and bad contacts. This can be done either by disabling sensors on the robot parts intended to interact or by running an algorithm that will decide if the upcoming contacts are desirable or not. In either case, control is compromised either by unprotecting certain parts of the manipulator or by giving the robot some sort of "judgment capability" which may in some situations be wrong. Furthermore, avoidance and reaction strategies rely on electronic components that can fail. Finally, one could argue that an operator may feel insecure working with a machine protected only by an algorithm. Thus, a third strategy may be employed to obtain compliant and dependable robots, which is to use a design strategy, e.g., to design robots that intrinsically prevent damaging contact.

To design robots to intrinsically prevent damaging contact, a typical approach is to make the robot compliant, to reduce the peak contact force attained during a collision. Compliance may also extend the duration of the contact, allowing the controller to sense a collision and react to reduce potential damages, within certain constraints, i.e., reaction time. However, adding compliance may limit the precision and stiffness of the robot, compromising performance and precision.

Some robots designed to avoid damaging contact incorporate a flexible flange with breakaway function that links the tool to the manipulator. This device triggers an emergency stop when the contact force at the tool control point exceeds a certain threshold, which may be a breakaway torque measured at the flange. This device therefore limits the moment, not the force that can be transmitted by the manipulator to the end-effector, which means that the threshold depends on the location of the collision point. Therefore, for a breakaway system, the design of the system must be sub-optimized for the worst case moment arm, which may result in a system which is overly sensitive and prone to false triggering in high inertia non-collision situations, which may require limitations on robot velocity.

Active compliance systems are in some aspects derived from admittance control techniques, e.g., efforts are measured at the effector and processed to command a displacement equal to the contact force divided by a virtual spring stiffness. Thus, the robot behaves like a spring around its trajectory. However, the response time of traditional actuators is larger than what is required to accommodate high frequency forces applied during collisions. Consequently, during a collision, the robot may not achieve a compliant behavior and thus this technique is not optimal as a design strategy.

Techniques may be used to provide passive compliance, at each joint of the robot, which may be programmable or non-linear. Programmable passive compliance consists of using a compliant joint for each axis of the robot and a supplemental set of actuators to allow the adjustment of the stiffness of each joint. Either two antagonistic actuators or a second actuator that adjusts the stiffness via a mechanism may be used, to allow high stiffness and precision at low velocity and low stiffness at high velocity, i.e. when contact with the manipulator may be more severe. This gives the controller the ability to continuously adjust the compromise between control and performance. However, using this type of passive compliance system adds weight and complexity to the manipulator. Also, for many mechanisms, the ratio between the largest stiffness and lowest stiffness is not sufficient to obtain high precision at low velocity, when collisions are less severe and high precision is required for acceptable robot performance.

SUMMARY OF THE INVENTION

Nonlinear passive compliance uses a method which places on each joint a mechanism whose compliance varies by purely mechanical means. By placing a mechanical device, such as a torque limiter, in series with each joint actuator, the resulting manipulator will be rigid unless external forces applied on it exceed a certain threshold, in which case the joint will become compliant. This technique allows the design of robots that are stiff and accurate in normal operating conditions, but compliant when collisions occur. Moreover, this principle is realized mechanically, which means that the reliability of this system does not depend on electronic components. However, this method is not optimized. By adding a torque limiter on each joint of a serial robot, the force threshold will depend on the configuration of the manipulator, because the relation between external forces and articular torques is determined by the Jacobian matrix of the manipulator, which is generally a function of the manipulator's pose. The threshold will also depend on the contact location and on the force orientation, which is not optimal since it means that the compliance level will vary throughout the robot's external surface.

Therefore, a force limiting device that comprises torque limiters placed in a Cartesian architecture provides numerous advantages over its articular counterpart. Provided herein is a force limiting device, which in a preferred embodiment improves the compliance level of suspended robots with constant end-effector orientation relative to the gravity direction, such as robots performing the Schönflies motions, as related to physical object-robot interfaces. The force limiting device includes a parallel mechanism with torque limiters which provide a rigid connection between the robot and its end-effector during normal operation, e.g., during non-collision conditions. When the robot end-effector contacts, as in a collision, a resisting object, the transmitted contact force activates the torque limiters of the force limiting device to yield a compliant connection between the robot and its end-effector, reducing the contact force and the severity of the impact. The force limiting device presented herein may be configured for one, two and three degrees of freedom (DOF) (respectively, 1-DOF, 2-DOF, 3-DOF).

In a preferred embodiment, the device provided herein is configured for use with an overhead robot to limit the collision force resulting from contact with the manipulator, end-effector and/or parts other than the robot's end-effector, such as tooling and/or payload, suspended from the overhead robot. Suspended robots of the type discussed herein are often found in manufacturing plants, and may also be found in other applications, such as hospital and medical applications and warehousing applications, for example.

As provided herein, if an excessive force in a direction corresponding to the degrees of freedom (DOFs) of the force limiting device is applied during a collision, the force limiting mechanism is activated and thus the end-effector is free to move relative to the robot and typically opposite to the direction of contact or collision. The activation of the mechanism is detected and brakes are applied to stop further motion of the robot in the direction of contact. The inertia of the parts located kinematically upstream of the force limiting device, e.g., the inertia of the robot from which the force limiting device is attached and the end effector is suspended, is thus removed from the collision. Also, for a quasi-static collision in which an object is clamped between the robot and a wall or other static fixture, the maximum contact force is the activation force of the force limiting device for that orientation, as determined by the configuration of the torque limiters in the mechanism. Hence, the contact force is reduced to improve damage control for all types of blunt collisions.

Architectures are provided herein for force limiting devices configured for one, two and three degrees of freedom (respectively, 1-DOF, 2-DOF, 3-DOF). The 1-DOF force limiting device provided herein includes a single parallelogram linkage that could be used when the robot's motion in one direction is more prone to contact than in other directions. The 2-DOF force limiting device provided herein includes four legs that form two parallelograms and thus behaves similarly to the 1-DOF mechanism. The 1-DOF and 2-DOF force limiting devices, as configured, are not sensitive to the weight of the suspended manipulator or end-effector and thus do not require gravity force compensation. A 2-DOF force limiting device may be especially appropriate for applications in industry requiring large and fast horizontal motion and small and slow vertical displacements.

The 3-DOF force limiting device presented herein is configured based on a Delta architecture. The 3-DOF force limiting device can be applied more generally than the 1-DOF and 2-DOF mechanisms because it may react to collisions occurring in any direction on the end-effector, e.g., it may react to contact forces independent of orientation of the contact force to the end-effector. Methods to compensate the effect of gravity on the 3-DOF delta configuration, where required when the end-effector weight or payload weight combined with the end-effector weight is large compared to the maximum static force limit that is imposed, are provided herein. Other possible configurations for a 3-DOF force limiting device are also provided within the scope of the claimed invention.

The force limiting mechanisms provided herein have a force threshold that is independent from the contact point on the end-effector, in contrast to known "moment limiting" devices. The force limiting devices also allow a larger displacement of the end-effector, which increases the distance and time available to mechanically stop a heavy overhead mounted manipulator or robot located above the force limiting device and suspended end-effector after a threshold contact force is detected. Because the nonlinear Cartesian compliance mechanism of the force limiting device described herein will react to Cartesian efforts, the polytope of the achievable forces will not be dependent on the pose of the contacting or colliding mechanism, e.g., the end-effector, and the force limiting device may be optimized by appropriately selecting a mechanism architecture (1-DOF, 2-DOF, 3-DOF) and by appropriately selecting limit torques for the torque limiters incorporated therein. To optimize the effectiveness of the force limiting device, the mechanism should preferably be isotropic, such that the achievable forces polytope will be a square in 2D or a cube in 3D.

The Cartesian mechanism (force limiting device) provided herein may be constructed using a parallelogram mechanism architecture incorporating torque limiters. A parallelogram architecture has the advantage of being stiffer than serial mechanisms. In a preferred embodiment, the force limiting Cartesian mechanism is placed between the robot and its end-effector. Thus, contact force is reduced to reduce damage and improve compliance for collisions between a contactable object and any portion of the end-effector or manipulator that is located upstream from the force limiting mechanism in the robot or manipulator's kinematic chain, e.g., between the contacted object and the force limiting device. For a robot or manipulator suspended on an overhead rail-bridge system, this configuration provides comprehensive protection against collisions of the manipulator and its payload with a contactable object, which may be an operator, by operatively disconnecting the end effector or colliding portion from the robot or overhead manipulator upstream from the force limiting device, so as to release the rigid connection between the end effector and overhead robot from which the end effector is suspended through the force limiting device.

Further, because the 1-DOF and 2-DOF mechanisms presented herein are not affected by gravity forces, the force limiting device may be effective without limiting the payload to be carried by the robot. This is also the case for the 3-DOF architectures when a gravity compensating mechanism is included, as provided herein. However, accelerations of the robot may induce inertial forces that may activate the torque limiters of the force limiting mechanism. Thus, for a given load, accelerations must be limited to a certain level to prevent the force limiting device from activating such that the end-effector becomes compliant, e.g., constructively disconnected, during movement in the absence of a collision. The maximum velocity that can be typically imposed on a robot is the maximum velocity that corresponds to blunt, unconstrained collisions which may be qualified as compliant. This "compliant" velocity is usually very low for heavy robots. However, if during a collision the end-effector is disconnected from the robot, e.g., the rigid connection between the robot and end effector is released so as to become compliant, the effective inertia to which the contacted object is subjected is then greatly reduced. Therefore, it can be assumed that using a force limiting mechanism as provided herein will allow an increase in the maximum velocity of a robot moving in an environment with potential for contactable object-robot interaction or physical object-robot interaction. This maximum velocity should typically be evaluated using a collision model that considers a broad spectrum of collision parameters, including, typically, the way the robot reacts when a collision is detected (braking force, delay before the brakes are applied, etc.).

As noted previously, collisions in which a contactable object is clamped to a wall or against another fixed object by a robot can be most severe. The force limiting mechanism described herein effectively reduces the maximum clamping force that the robot can apply in quasi-static condition to a force level determined by the limit torque levels set as limits for the torque limiters incorporated in the force limiting device. As the velocity of the robot system increases beyond a quasi-static, or very low velocity condition, compliance is improved because the inertia impacting the contactable object against the wall in a clamping condition is reduced. Because the force limiting mechanism is unable to store elastic potential energy, the robot will not continue to push on the contacted object after the collision has taken place and the force limiting device has been activated. This is an advantage since it will help the movement of the robot away from the contacted body after the collision.

As discussed previously, some robots incorporate a flexible flange with breakaway function to limit the moment, not the force, transmitted by the manipulator to the end-effector during a collision. These systems are often sub optimized for the worst case moment arm, resulting in a limited velocity, overly sensitive system prone to false triggering of the breakaway mechanism and deteriorated performance. In contrast, the collision force required to activate the Cartesian force limiting device provided herein is constant across the entire end-effector collision space, e.g., the activation force does not vary with a moment arm, as described further herein. This activation behavior is preferable since a collision generally occurring anywhere on the end-effector will be reacted to at a relatively constant activation force, optimizing the robot design by allowing the minimum activation force to be maximized while reducing the sensitivity of the force limiting mechanism to non-collision inertia during robot movement. As an additional advantage, the force limiting mechanism provided herein has a large achievable displacement compared to the breakaway device, which yields the space, and therefore reaction time, required by a heavy overhead mounted manipulator to stop prior to non-compliant contact with the object involved in the collision.

A force limiting device configured to limit the contact force of a moving object with a contacted object is provided herein. The force limiting device includes a first attachment, which may be an upper platform or interface, a second attachment, which may be a lower platform or interface and one or more parallelogram linkages. The force limiting device may be connected at a first end to the first attachment and may be connected at a second end to the second attachment, using one or more connection points. The connection points may include rotatable joints. The connection of the parallelogram linkage to the attachments may be through a rotatable joint or through an intermediate segment, such as a leg connected to the parallelogram linkage at one end and to the attachment at the other end. The one or more parallelogram linkages establish the orientation of the first attachment to the second attachment; e.g., the first attachment may be oriented to be parallel to the second attachment with the same orientation relative to their common normal axis.

The force limiting device may include two parallelogram linkages which are arranged to be perpendicular to each other, such that the axes of the planes of the parallelogram linkages are coincident. The parallelogram linkages are configured to transmit an input torque, where the input torque is, for example, a couple resultant from a force against the suspended portion attached to the second attachment opposing the movement of the robot attached to the first attachment.

The force limiting device may be attached to the moving portion and the suspended portion of a robot, to operatively connect the moving portion and the suspended portion of the moving object. The force limiting device is configured to maintain a rigid orientation between the first attachment and the second attachment when the input torque is less than the activation torque; and to be activated when the input torque transmitted through one or more of the parallelogram linkages exceeds an activation torque. When the force limiting device becomes activated, it is configured to become compliant and thereby cause the contact force between the moving object and the contacted object to be decreased. The force limiting device may be compliant by compliance of the parallelogram linkage.

Alternatively, the joints of each of the one or more parallelogram linkages may be rotatable. One of the rotatable joints of each parallelogram linkage may include a torque limiting mechanism configured to activate the force limiting device when the input torque exceeds a torque limit. Alternatively, a torque limiter may be substituted for one of the rotatable joints of each parallelogram linkage, or may be operatively included at an attachment point between the force limiting device and the robot. The torque limit of the torque limiting mechanism is typically set equivalent to the activation torque.

The force limiting device may include three or more parallelogram linkages arranged in a Delta configuration, e.g., a parallel arm arrangement. In a preferred embodiment, the parallelogram linkages are configured so as to be spaced 120 degrees equidistant from each other; however spacing with angles different than 120 degrees is understood to be within the scope of the claimed invention. The Delta configured force limiting device may further include a gravity compensating mechanism configured to include a spring, an actuator, a counterbalance system which may include counterweights and pulleys, or a combination of these. The gravity compensating mechanism may be configured to compensate for the weight of the suspended portion, the weight of a payload, which may be variable, or the combined weight of the suspended portion and a payload.

The force limiting device may be included in a robot system adapted for overhead suspension, the system including a robot capable of moving, and a suspended portion which is operatively connected to and suspended from the robot. The force limiting device may be attached between the robot and the suspended portion, to operatively connect the robot and the suspended portion. When the suspended portion, which is manipulated and moved by the robot, exerts a contact force against an object, an activation force is inputted to the suspended portion opposing the contact force. The force limiting device is configured to become activated and when activated, become compliant when the activation force exceeds an activation level. When the force limiting device becomes compliant, the contact force exerted by the suspended portion against the contacted object is immediately and substantially decreased, to prevent or minimize damage to the contacted object. In a workspace including robots, the contacted object may be another piece of equipment or stationary fixture.

The force limiting device provided herein increases the compliance level of physical object-robot interactions. As would be understood by those skilled in the art to be within the scope of the claimed invention, the force limiting device may be used in other environments, for example, controlled (fenced or gated) work cells, to minimize damage to the robot system, robot, end-effector, manipulator, payload, tooling, other objects and equipment in the workspace, etc. by minimizing the force of non-intended moving robot-to-moving object or moving robot-to-stationary object collisions. The force limiting device may be used in any scenario where a release of a rigid connection in response to an activation force is desirable to alleviate or minimize damage resulting from a collision with one or move moving or static objects incorporating the force limiting device.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1A is a schematic perspective view of a robot system including a force limiting device, showing the robot system in motion toward an object adjacent a stationary object such as a wall;

FIG. 1B is a schematic perspective view of the robot system of FIG. 1A with the robot system end effector contacting an object in a clamping collision;

FIG. 1C is a schematic perspective view of the robot system of FIG. 1A with the force limiting device activated;

DESCRIPTION OF THE PREFERRED EMBODIMENTS

Figure 2A:
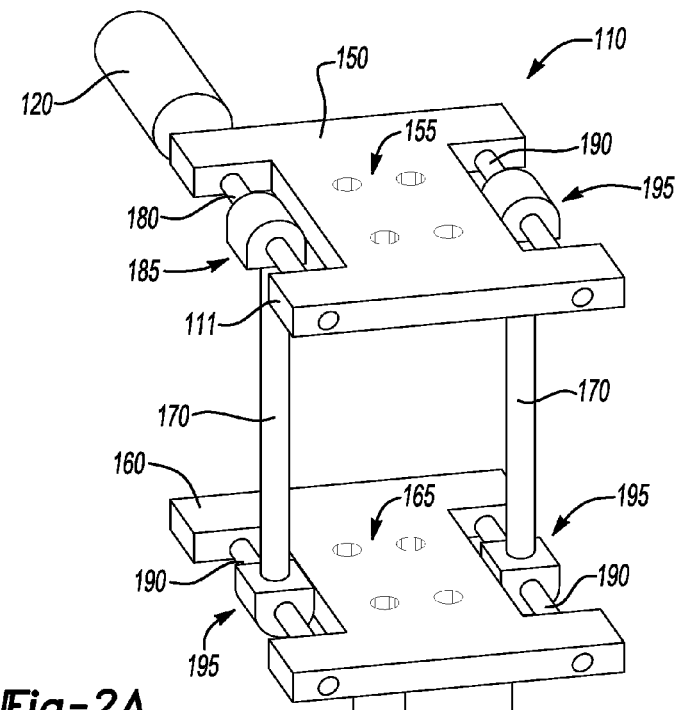
FIG. 2A is a schematic perspective view of a force limiting device in a 1-DOF parallelogram configuration.

Provided herein is a force limiting device to increase the compliance level of suspended robots, as related to physical object-robot interfaces. The force limiting device described herein is a parallelogram mechanism with torque limiters which provide, during non-collision operation, a rigid connection between the robot and its end-effector. If an excessive force in a direction corresponding to the degrees of freedom (DOFs) for which the force limiting device is configured is applied during a collision, the force limiting mechanism is activated and the end-effector becomes compliant, e.g., is free to move relative to the robot and typically opposite to the direction of the collision. Brakes or like functioning devices are applied to stop further motion of the robot in the direction of contact when the force limiting device is triggered or activated. The inertia of the moving robot located kinematically upstream of the force limiting device is thus removed from the collision, and for a quasi-static collision, the maximum contact force is the activation force of the force limiting device for that orientation, as determined by the configuration of the torque limiters in the mechanism.

In a preferred embodiment, the device provided herein is configured for use with an overhead mounted robot to limit the collision force resulting from contact with the end-effector, robot arm, tooling and/or payload suspended from the robot. Different architectures are provided for force limiting devices configured for one, two and three degrees of freedom (respectively, 1-DOF, 2-DOF, 3-DOF).

Referring to the drawings, wherein like reference numbers refer to like components, shown in FIGS. 1A, 1B and 1C is a schematic perspective view of a robot system 100 including a force limiting device 110. The robot system 100 includes a robot 105, which is suspended from an overhead support system, which may be a ceiling or an overhead rail system. Robot system 100 further includes a force limiting device 110 operatively connected to robot 105 through an interface 150, and a suspended portion 115, which may be a robot arm, end-effector or similar mechanism. The suspended portion or end-effector 115, which is operatively connected to the lower portion of force limiting device 110, may include additional tooling and/or include a payload. Robot system 100 may also include, as would be understood by those skilled in the art, a control system, which may include a controller, controls, sensors and other mechanisms commonly included in a robot system. Robot system 100 further includes a braking mechanism 113 to stop motion of robot 105. The braking mechanism 113 of robot 105 may be initiated by the robot controls or by triggering the force limiting device 110.

Referring to FIG. 1A, shown is the robot system 100 moving in a direction 125 toward an object 130. In the arrangement shown, object 130 is positioned between a stationary object, such as a wall 117, and the robot system 100 such that continued movement of robot system 100 in direction 125 will result in contact of the robot arm or end-effector 115 with the object 130. As described previously, end-effector 115 is suspended from force limiting device 110, which is operatively attached through interface 150 to robot 105. Force limiting device 110 includes a jointed parallelogram linkage 111 in which one revolute joint is replaced with a torque limiter 120, which will be described further. Under the conditions shown in FIG. 1A, there is no torque input into torque limiter 120 with respect to robot 105 and end-effector 115, therefore torque limiter 120 maintains the parallelogram linkage 111 of force limiting mechanism 110 in a static or rigid state, thus maintaining a rigid connection between end-effector 115 and robot 105.

As shown in FIG. 1B, robot 105 has continued in direction 125 such that end effector 115 has made contact with object 130 at contact point 135, in a clamping collision, whereby object 130 has become clamped against the stationary fixture or wall 117. As robot 105 continues movement in direction 125, end effector 115 exerts an increasing contact force on object 130 at contact point 135. Object 130 exerts an opposing force at contact point 135 on end effector 115 which is transmitted to force limiting device 110, including the joint replaced by torque limiter 120. When the opposing force exerted against end effector 115 at the point of contact 135 in combination with the continued movement of robot 105 in direction 125 results in a torque input to torque limiter 120 exceeding its torque limit or trigger point, the force limiting device 110 is activated.

Upon activation of the force limiting device 110, and referring now to FIG. 1C, two events occur. First, the torque limiter 120 releases, resulting in the compliant movement of the parallelogram linkage 111 of force limiting device 110 in a direction 140 which immediately and substantially decreases and/or relieves the contact force exerted by end effector 115 on object 130. Secondly, the activation of force limiting device 110 triggers the braking mechanism 113 of robot 105 to stop any movement of robot 105 in direction 125. Thus, by activating force limiting device 110, damage to object 130 from contact with end effector 115 may be minimized or avoided.

The nonlinear Cartesian compliance mechanism 110, or force limiting device 110 can therefore be said to operatively "disconnect" the end-effector 115 from the robot 105 over a certain distance when a collision occurs, that distance being determined by the geometry of force limiting device 110 as it complies, releasing and/or relieving the contact force of end-effector 115 from the contacted object, which may be a object 130. The operative "disconnection" of end-effector 115 over a certain distance or space provides the distance and time required to stop the movement of the robot 105 and robot system 100, thus substantially or fully relieving the collision force at contact point 135. As shown in FIGS. 1A-1C, the force limiting device 110 as provided herein is well suited for applications such as robots suspended on rail-bridge systems, however may be applicable to other systems and configurations within the scope of the claimed invention.

Returning to FIGS. 1A-1C, the contact force over time can be described in phases. The contact force or collision force between the end effector 115 and contacted object 130, is zero in FIG. 1A, during the pre-collision phase. As robot system 105 continues movement in direction 125, and when end-effector 115 makes contact with object 130, which is entrapped between end-effector 115 and the stationary wall 117 in an initial collision phase, the contact force at contact point 135 increases until the activation torque of torque limiter 120 is attained and force limiting device 110 is triggered. In a third phase, force limiting device 110 becomes compliant, resulting in an immediate and substantial decrease in the contact force at contact point 135, due to the activation of the torque limiter 120. The force required to overcome the continued movement of robot system 100 is still present, but is eliminated in a final phase when the movement of robot 105 is stopped by triggering brake 113 concurrently with activation of force limiting device 110 during the initial collision phase. So long as robot 105 can be stopped within the geometric compliance limits of force limiting device 110, the inertia from robot 105 does not contribute further to the contact force on object 130 at contact point 135. The trigger value or torque limit established and set for torque limiter 120 should consider the geometric compliance limits of the force limiting device 110 and the braking dynamics of robot 105, which may be different depending on the orientation of the collision angle of the end effector 115 with respect to the parallelogram configuration of torque limiting device 110.

Figure 2B:
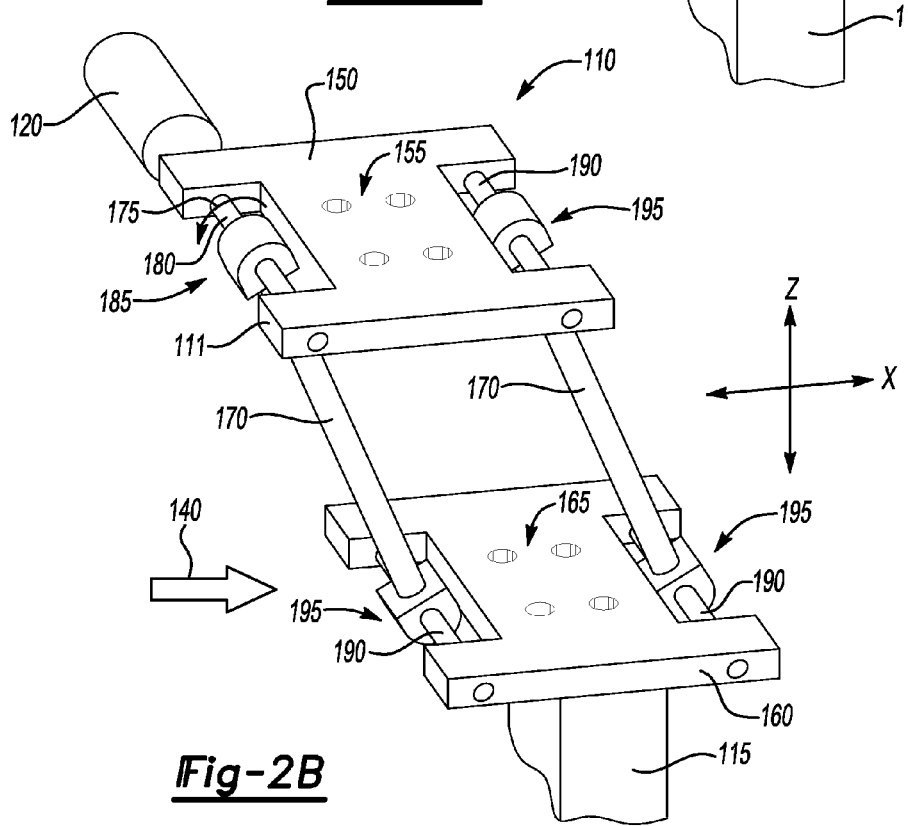
FIG. 2B is a schematic perspective view of the force limiting device of FIG. 2A in an activated condition.

Referring now to FIGS. 2A and 2B, shown is a schematic perspective view of a force limiting device 110 in a 1-DOF parallelogram configuration. FIG. 2A shows force limiting device 110 in a non-activated state, where torque limiter 120 acts to maintain the parallelogram linkage 111 of device 110 in a rigid configuration. FIG. 2B shows force limiting device 110 in an activated state, where the threshold torque has been met to release torque limiter 120 such that the parallelogram linkage 111 reacts compliantly to force 140, the contact force at contact point 135 during a collision of the robot system 100 with a fixed or constrained object, e.g., the object 130 in the clamping collision illustrated in FIGS. 1A-1C. The force limiting device 110 includes an upper platform or interface as a first attachable portion 150 which is operatively attachable to robot 105. FIGS. 2A and 2B provide holes 155 as an attachment interface through which device 110 may be bolted, pinned or riveted, for example, to robot 105. As would be understood, any suitable means known to those skilled in the art may be used to fixedly attach the upper interface 150 of force limiting device 110 to robot 105. The force limiting device 110 includes a lower platform or interface as a second attachable portion 160 which is operatively attachable to robot arm or end-effector 115. FIGS. 2A and 2B provide holes 165 as an attachment interface through which device 110 may be bolted, pinned or riveted, for example, to robot arm or end-effector 115, however any suitable means known to those skilled in the art may be used to fixedly attach the lower interface 160 of force limiting device 110 to robot arm or end-effector 115.

Referring now to FIG. 2A, the 1-DOF force limiting device 110 shown includes a single parallelogram linkage 111 that may optimally be used when the motion of robot system 100 in one direction is much more undesirable than in other directions. FIG. 2A shows a simple 1-DOF nonlinear Cartesian compliance mechanism 110, also referred to as a 1-DOF force limiting device 110 mounted between a suspended robot 105 and its end-effector 115. Mechanism 110 includes a parallelogram linkage 111 in which one revolute joint 185 is replaced with a torque limiter 120. The parallelogram linkage consists of two legs 170 attached through revolute joints 185, 195 and shafts 180, 190 to platforms 150, 160, and generally configured as illustrated by FIG. 2A. Referring to FIG. 2A, the three joints 195 are passive revolute joints which are rotatable about shafts 190 where shafts 190 are rotatively or fixedly attached to platforms 150, 160. Alternatively, the joints 195 may be fixedly attached to shafts 190, where shafts 190 are rotatively attached to platforms 150, 160. The fourth joint 185 is fixedly attached to input shaft 180, such that as the parallelogram linkage 111 is subject to a generally horizontal force (as oriented in FIG. 1A), such as a force 140 (see FIG. 2B), the input shaft 180 provides an input torque, such as input torque 175, to torque limiter 120.

Under normal conditions, the torque limiter 120 restrains the rotation of shaft 180 and thus prevents the parallelogram linkage of force limiting device 110 from moving, maintaining a rigid connection between robot 105 and end-effector 115. However, if a contacting collision occurs, for example, a collision of the type illustrated in FIG. 1B, the couple 175 passing through torque limiter 120 exceeds set limits and force limiting mechanism 110 is activated and moves responsively to force 140, as shown in FIG. 2B. This compliant movement functionally "disconnects" end-effector 115 from robot 105 with respect to a generally horizontal plane and thus immediately and substantially relieves the contact force of end effector 115 from the object involved in the collision, e.g., the object 130 shown in FIGS. 1A-1C. Following activation and responsive compliant movement of force limiting device 110, the object 130 is only subjected to the inertia of end-effector 115, which can be significantly lower than the inertia of the entire robot system 100. For the force limiting mechanism 110 to be effective in improving compliance by reducing the contact force on the object, the collision must be detected and robot 105 must be stopped or braked before the parallelogram linkage 111 of mechanism 110 reaches the end of its travel, e.g., its geometric limit. The collision can be detected with a limit switch (not shown) placed on the mechanism 110, e.g., in contact with one of the parallelogram links and a signal can be sent to the controller of robot 105 to brake the system, or alternatively, an emergency stop signal can be sent directly to the brake system 113 of robot 105 without passing through the robot's controller, thus improving the reliability of the system by reducing the risks of electronic component failure. Once robot 105 is stopped, the gravity force of the suspended robot arm 115 tends to naturally return force limiting mechanism 110 to its original position. One important advantage of the parallelogram architecture of force limiting device 110 is that the couple passing through the torque limiter 120 only depends on the magnitude of the horizontal force 140 (referring to FIG. 2B) applied on end-effector 115 and is not affected by the height of the point of application of the force, e.g., the distance between contact point 135 and torque limiter 120 (see FIG. 1B). This implies that the same force level will cause the activation of the force limiting mechanism 110 whether the collision occurs at the top, middle or bottom portion of the object 130, or at an end or middle portion of end-effector 115. This provides a significant advantage over breakaway systems which are sensitive to length of the moment arm of the contact force, e.g., the distance of the collision contact point 135 from the actuation point of the force limiting mechanism.

Figure 3:
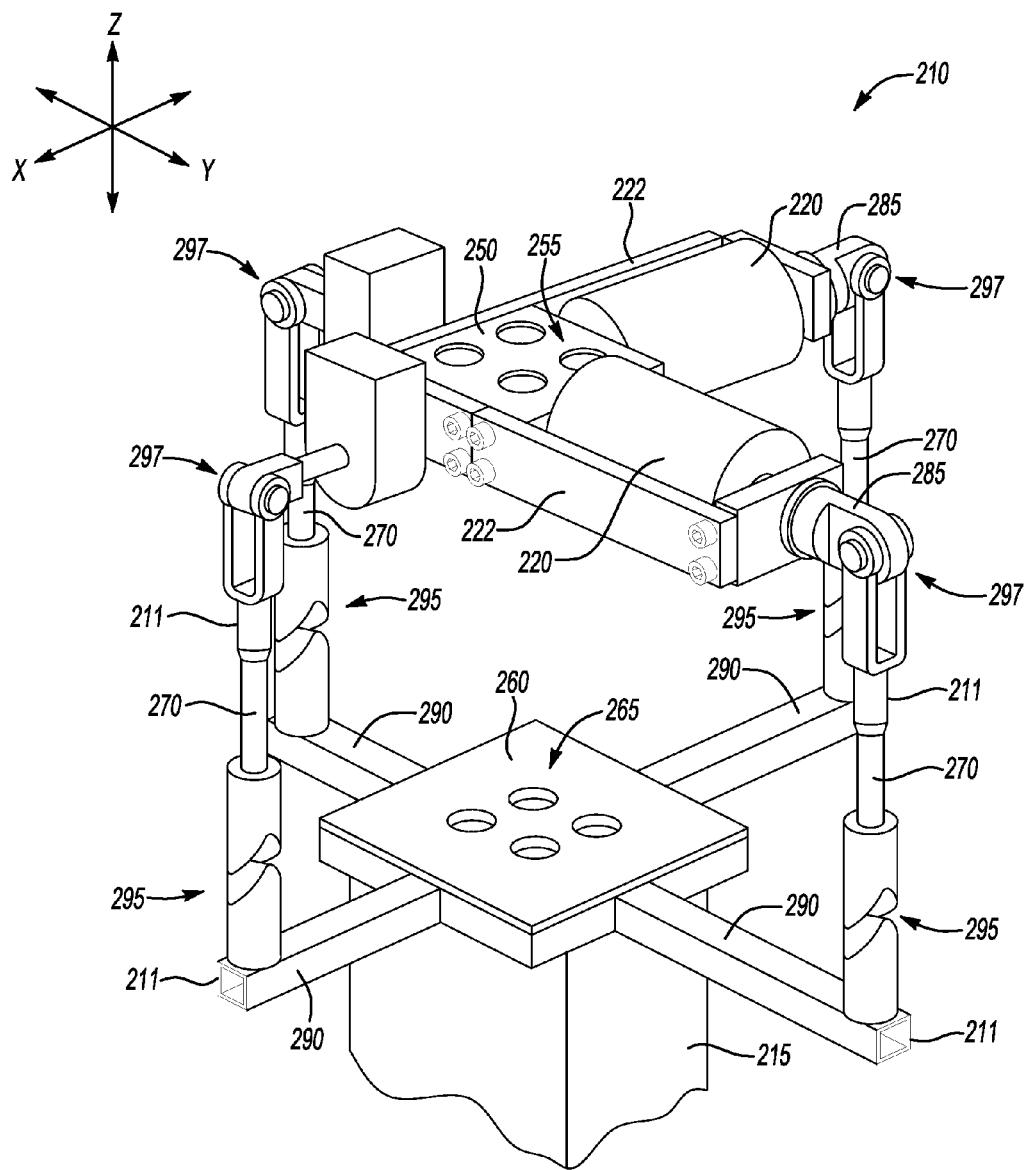
FIG. 3 is a schematic perspective view of a force limiting device in a 2-DOF parallelogram configuration.

FIG. 3 is a schematic perspective view of a force limiting device 210 in a 2-DOF parallelogram configuration. 2-DOF force limiting device 210 has four legs 270 that form two parallelogram linkages 211 and thus behaves similarly to 1-DOF force limiting device 110. 1-DOF force limiting device 110 and 2-DOF force limiting device 210, as configured and provided herein, are not sensitive to the gravity force of the suspended weight of end-effector 115, 215 and thus do not require a gravity compensating mechanism. A 2-DOF force limiting device 210 is especially appropriate for applications requiring large and fast horizontal motion of a robot system 100 and small and slow vertical displacements.

Referring to FIG. 3, 2-DOF force limiting device 210 has a parallelepipedic architecture making it potentially suitable as a mechanism to reduce the collision force for collisions occurring across the horizontal plane, e.g., the X-Y plane of FIG. 3. This is accomplished using a parallel architecture as generally shown in FIG. 3, which is composed of four identical legs 270 which each include a pivoting joint 297 and a pivoting joint 295, where each pair of pivots 295, 297 has their axes in two perpendicular, horizontal directions. The legs 270 are placed in such a way that the axes of the first set of pivots 297 intersect at a single point, e.g., the X-Y origin generally at the center of upper platform 250, two of them sharing the same axis, perpendicular to the axis of the other two. The axes of the second set of pivots 295 are oriented similarly to the first set of pivots 297, in a plane parallel to the X-Y plane defined by the axes of the second set of pivots 297. The parallelogram linkages 211 are operatively attached to the attachable portion or lower platform 260 through legs 290. Additionally, brackets 222 may be included to operatively attach parallelogram linkages 211 and/or torque limiters 220 to the attachable portion or upper platform 250. Upper platform 250 is fixedly attachable to robot 105 and lower platform 260 is fixedly attachable to end-effector 215. Similar to the attachment configuration discussed for device 110, and as shown for the embodiment of device 210 in FIG. 3, upper platform 250 is provided with holes 255 as an attachment interface through which device 210 may be bolted, pinned or riveted, for example, to robot 105, or any suitable means known to those skilled in the art may be used to fixedly attach the upper interface 250 of force limiting device 210 to robot 105. The force limiting device 210 includes a lower platform or interface 260 which is operatively attachable to robot arm or end-effector 215. FIG. 3 provides holes 265 as an attachment interface through which device 210 may be bolted, pinned or riveted, for example, to robot arm or end-effector 215, however any suitable means known to those skilled in the art may be used to fixedly attach the lower interface 260 of force limiting device 210 to robot arm or end-effector 215.

The workspace of force limiting mechanism 210 is a sphere centered on upper platform 250 and the orientation of lower platform 260 remains the same relative to upper platform 250. Two of the first sets of pivots 297 are connected to input attachments 285, to provide input to torque limiters 220, providing similar behavior and function as 1-DOF mechanism 110 described earlier. For the 2-DOF architecture of device 210, only three of the four legs 270 are required to kinematically constrain mechanism 210 in a non-collision situation. The fourth leg 270 over-constrains mechanism 210, providing the advantage of adding stiffness and reducing the effect of backlash if, for example, the length of one of the leg 270 is adjusted to provide an internal pre-load to mechanism 210. Force limiting device 210 presents similar advantages as force limiting device 110, e.g., the magnitude of contact or collision force that will activate force limiting mechanism 210 is only dependent on the orientation and not the height of contact point 135 or the distance between contact point 135 and torque limiters 220 (see FIG. 1B), and after a collision triggering force limiting device 210, gravity tends to return mechanism 210 to its original configuration.

Referring to FIG. 3, the activation sequence of force limiting device 210 is similar to that described for force limiting device 110 in FIGS. 1A through 2B. Under normal conditions, torque limiters 220 restrain the rotation of pivots 295, 297 and shafts 270 and thus prevents the parallelogram linkages 211 of force limiting device 210 from moving, maintaining a rigid connection between robot 105 attached to attachment plate 250 and end-effector 215 attached to attachment plate 260. However, if a contacting collision occurs, for example, a collision of the type illustrated in FIG. 1B, torque is transmitted though the parallelogram linkages of force limiting device 210 to torque limiters 220. When this transmitted torque exceeds a set limit for either of the torque limiters 220, force limiting mechanism 210 is activated and moves responsively in opposition to the contact force in direction 140 (see FIG. 1C). When at least one of the torque limiters 220 releases its respective input attachment 285 when the input torque from the transmitted contact force exceed the set limit of the torque limiter 220, the force limiting device is released from its rigid configuration and becomes compliant. Legs 270 rotate and pivot using pivots 295, 297 responsive to and opposing the contact force. This compliant movement functionally "disconnects" end-effector 215 from robot 105 with respect to a generally horizontal plane and thus immediately and substantially relieves the contact force of end effector 215 from the object involved in the collision, e.g., object 130 shown in FIGS. 1A-1C. Following activation and responsive compliant movement of force limiting device 210, the object 130 is only subjected to the inertia of end-effector 215, which can be significantly lower than the inertia of the entire robot system 100. For the force limiting mechanism 210 to be effective in improving compliance by reducing the contact force on the object, the collision must be detected and robot 105 must be stopped before the parallelogram linkage 211 of mechanism 210 reaches the end of its travel, e.g., its geometric limit. The collision can be detected with a limit switch (not shown) placed on the mechanism 210, e.g., in contact with one of the parallelogram links 211 and a signal can be sent to the controller of robot 105 to brake the system, or alternatively, an emergency stop signal can be sent directly to the brake system 113 of robot 105 without passing through the robot's controller, thus improving the reliability of the system by reducing the risks of electronic component failure. Once robot 105 is stopped, the gravity force of the suspended robot arm 215 tends to naturally return force limiting mechanism 210 to its original position.

Figure 4A:
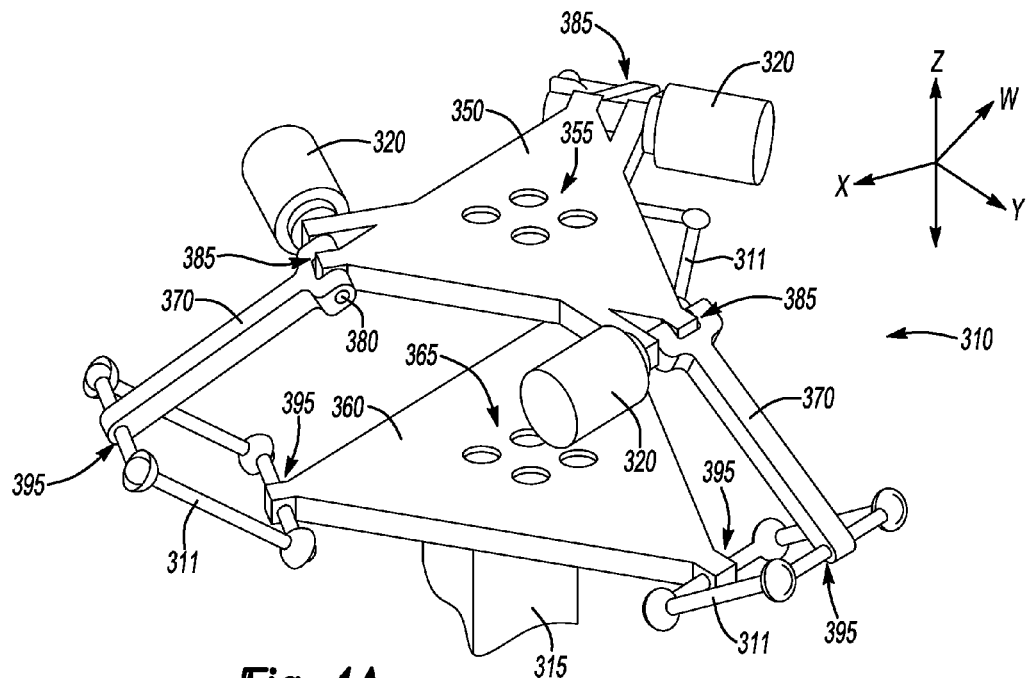
FIG. 4A is a schematic perspective view of a force limiting device in a 3-DOF delta configuration.
Figure 4B:
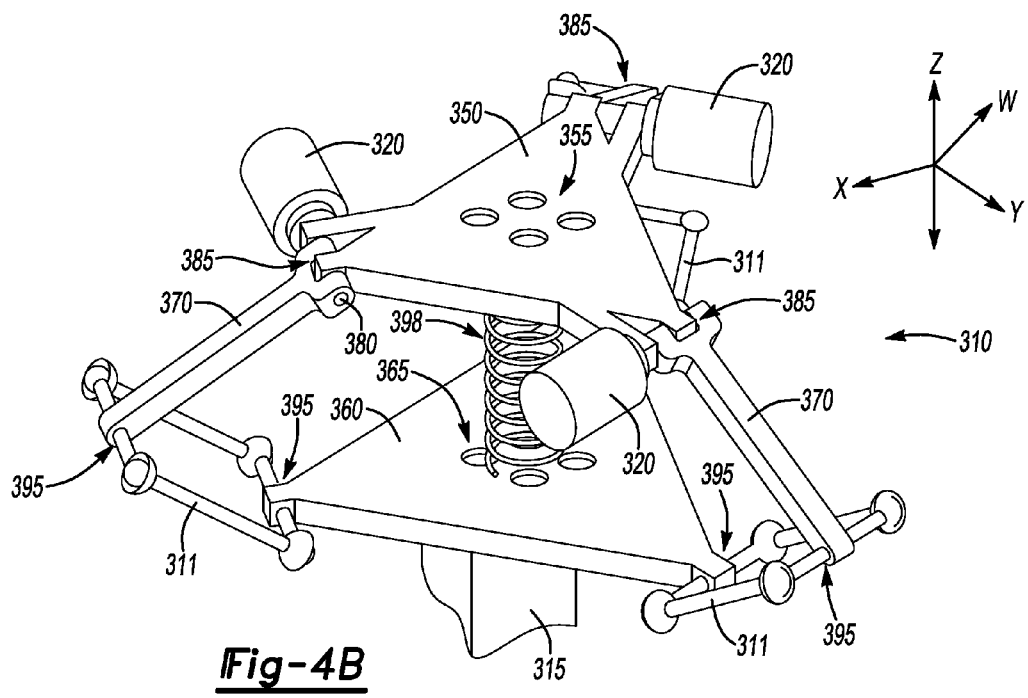
FIG. 4B is a schematic perspective view of the force limiting device of FIG. 4A configured for gravity compensation.

Referring now to FIGS. 4A and 4B, shown in FIG. 4A is a schematic perspective view of a force limiting device 310 in a 3-DOF delta configuration; and FIG. 4B provides a schematic perspective view of the force limiting device 310 of FIG. 4A configured for gravity compensation. Referring to FIG. 4A, the 3-DOF force limiting device 310 presented herein is configured based on a Delta architecture. A 3-DOF force limiting device 310 can be applied more generally than a 1-DOF force limiting device 110 or a 2-DOF force limiting device 210 because a 3-DOF device 310 can react to collisions occurring in any direction with end-effector 315 including collisions with a vertical force component. Methods to compensate the effect of gravity on a 3-DOF delta configuration, where required when the weight of the end-effector or combined weight of the payload with the end-effector is large compared to the maximum static force limit that is imposed, are provided herein. Other possible configurations for 3-DOF force limiting devices are also provided within the scope of the claimed invention.

As discussed previously for force limiting devices 110, 210, force limiting device 310 includes an upper platform 350 which is configured to be fixedly attachable to robot 105 and a lower platform 360 is fixedly attachable to end-effector 315. Similar to the attachment configuration discussed for devices 110, 220 and as shown for the embodiment of device 310 in FIG. 4A, upper platform 350 is provided with holes 355 as an attachment interface through which device 310 may be bolted, pinned or riveted, for example, to robot 105. As is understood, any suitable means known to those skilled in the art may be used to fixedly attach the upper interface 350 of force limiting device 310 to robot 105. The force limiting device 310 includes a lower platform or interface 360 which is operatively attachable to robot arm or end-effector 315. FIG. 4A provides holes 365 as an attachment interface through which device 310 may be bolted, pinned or riveted, for example, to robot arm or end-effector 315, however any suitable means known to those skilled in the art may be used to fixedly attach the lower interface 360 of force limiting device 310 to robot arm or end-effector 315.

Referring to FIG. 4A, shown is a preferred embodiment of a 3-DOF force limiting device 310 with a Delta architecture comprising three legs 370, each operatively connected to a torque limiter 320 that positions the upper link 395 of a parallelogram linkage 311 whose lower link 395 is operatively attached to lower platform 360. Each of the four corner joints of each parallelogram linkage 311 are schematically represented in FIG. 4A by a spherical joint, although other types of joints, e.g., universal joints, may be used in the parallelogram linkage within the claimed scope of the invention. The parallelogram linkages 311 constrain the orientation of lower platform 360 in a way such that upper platform 350 and lower platform 360 maintain a constant orientation relative to each other. Force limiting device 310, when activated by a force above the preset threshold of any of the torque limiters 320, can perform translation in the X, Y and Z directions (see FIG. 4A). For the configuration of device 310 shown in FIG. 4A, it is assumed that the optimal design of a force limiting device 310 using the Delta architecture will comprise identical legs 370 that are equally spaced, i.e., placed 120° relative to one another with equal radii for attachment points on the platforms 350, 360. However, it is understood that the Delta architecture is not restricted to three legs. For example, four or more legs could be used with the same general behavior, although the mechanism would be over constrained. It is further understood that the legs may be spaced with angles different than 120 degrees and yield the same general behavior.

Two kinematic properties of the 3-DOF configuration should be optimized for efficiency of force limiting device 310. The first property is the workspace of force limiting device 310. Since robot 105 must be capable of braking prior to travel a distance exceeding the geometric motion limit of force limiting device 310, the optimal workspace for device 310 will be a sphere centered at its reference point. The radius of that sphere needs to be equal to the maximum braking distance of robot 105 considering collisions occurring in any direction. Secondly, an isotropic Jacobian matrix will give the maximal ratio of the minimum over the maximum forces needed to activate force limiting device 310. The isotropy of the achievable force space is more difficult to obtain for a 3-DOF mechanism 310, however, it is obtainable for the reference point of the mechanism 310 by choosing design parameters assuming the optimal achievable force polyhedron is a cube.

Referring to FIG. 4A, the activation sequence of force limiting device 310 is similar to that described for force limiting devices 110 and 210. Under normal conditions, torque limiters 320 restrain the rotation of pivots 395 and legs or shafts 370 and thus prevents the parallelogram linkages 311 of force limiting device 310 from moving, maintaining a rigid connection between robot 105 attached to attachment plate 350 and end-effector 315 attached to attachment plate 360. However, if a contacting collision occurs, for example, a collision of the type illustrated in FIG. 1B, torque is transmitted though the parallelogram linkages 311 of force limiting device 310 to torque limiters 320. When this transmitted torque exceeds a set limit of any one of the torque limiters 320, force limiting mechanism 310 is activated and moves responsively in opposition to the contact force in direction 140 (see FIG. 1C). When at least one of the torque limiters 320 releases its respective pivot point 385 when the input torque from the transmitted contact force exceed the set limit of the torque limiter 320, the force limiting device 310 is released from its rigid configuration and becomes compliant. Legs 370 become rotatable and pivot about pivots 385, 395, and parallelogram linkages 311 move responsively to and opposing the contact force. This compliant movement functionally "disconnects" end-effector 315 from robot 105 with respect to a generally horizontal plane and thus immediately and substantially relieves the contact force of end effector 315 from the object involved in the collision, e.g., the object 130 shown in FIGS. 1A-1C. Following activation and responsive compliant movement of force limiting device 310, the object 130 is only subjected to the inertia of end-effector 315, which can be significantly lower than the inertia of the entire robot system 100. For the force limiting mechanism 310 to be effective in improving compliance by reducing the contact force on the object, the collision must be detected and robot 105 must be stopped before the rotating legs 370 and parallelogram linkages 311 of mechanism 310 reach the end of travel, e.g., the geometric limits of the collective linkage and structure of force limiting device 310. The collision can be detected with a limit switch (not shown) placed on the mechanism 310, e.g., in contact with one of the parallelogram links 311 and a signal can be sent to the controller of robot 105 to brake the system, or alternatively, an emergency stop signal can be sent directly to the brake system 113 of robot 105 without passing through the robot's controller, thus improving the reliability of the system by reducing the risks of electronic component failure. Once robot 105 is stopped, the gravity force of the suspended robot arm 315 tends to return force limiting mechanism 310 to its original position.

The 3-DOF force limiting device 310 as configured in FIG. 4A, which is sensitive to collisions from all directions, including collision directions with a vertical component, may also be sensitive to the gravity force representing the weight of end-effector 315 and its payload. The gravity force of end-effector 315 or the combined gravity force of end-effector 315 with a payload may create a load on torque limiters 320 that will eventually limit the force that the end-effector 315 can apply to accomplish a certain task. Also, the gravity force from the weight of the payload and/or end-effector 315 might exceed the activation limits of force limiting device 310, potentially rendering device 310 ineffective in a collision situation. The potential effect of the gravity force from the weight of the end-effector 315 can be counteracted using gravity balancing when the combined weight of the payload and the end-effector 315 is large relative to the activating contact force limit for the force limiting device 310, to maintain the effectiveness of force limiting device 310 in a collision event.

Referring to FIG. 4B, counterbalancing a parallel mechanism such as force limiting device 310 is usually complex because of the nonlinear and coupled relation between Cartesian and articular displacements. In the present situation, however, the force limiting device need only be balanced for one configuration or condition of use, e.g., suspending the end-effector arm 315 during normal operation. In a collision situation, when the force limited device 310 is activated to respond to the contact force of the collision from any direction, it is unnecessary to counterbalance the gravity load of end-effector 315, because the prioritized response in a collision situation is relief of the contact force, not robot performance. Therefore, it is acceptable to incorporate a counterbalancing mechanism that balances the gravity load from the weight of the end-effector 315 in only the neutral configuration, e.g., when the arm 315 is suspended and in use during normal non-collision robot operating conditions. In this case, and when the gravity force from the weight of arm 315 and any payload is relatively constant, the counterbalancing mechanism may be simply a pre-loaded spring 398, as shown in FIG. 4B, which provides advantages of mechanical simplicity and low weight. Notably, this counterbalancing method is valid only if the spring 398 does not limit the workspace of device 310, which might only be possible for smaller leg length ratios.

Figure 5:
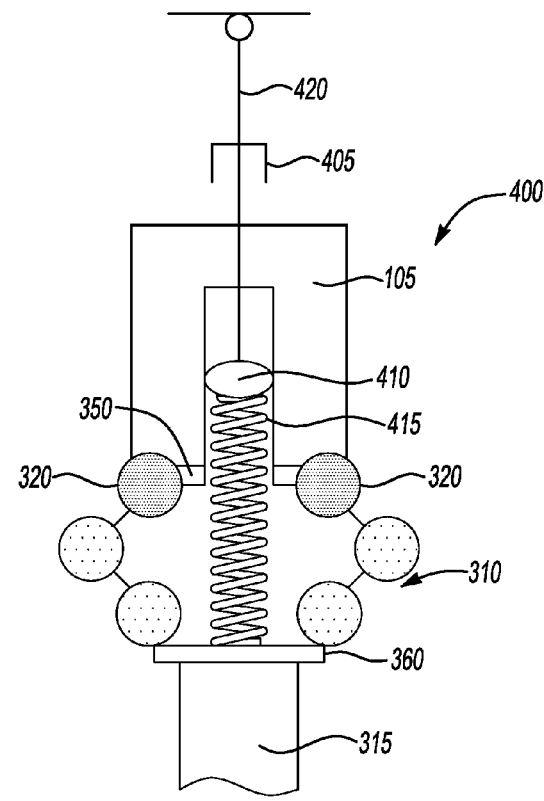
FIG. 5 is a schematic plan view of a gravity compensating device for use with the force limiting device of FIG. 4A.

Alternatively, and referring now to FIG. 5, when the gravity force from the weight of arm 315 and any payload may be variable, balancing the variable gravity load with a spring 415 may require an actuator 405 to modify the position of one of the spring's anchor points 410, where the actuator 405 must provide a force equal to the gravity force. Shown in FIG. 5 and generally indicated at 400, a counterbalance system may be provided where an actuator 405 could adjust the counterbalance when the gravity force changes, for example, when the robot arm 315 is picking up a new payload. To do so, the upper anchor point 410 of counterbalance spring 415 could be mounted on a linear guide 420 with a locking system 410 (included in upper anchor point 410). In normal (unloaded) mode, the anchor point 410 is locked and thus the force limiting device 310 is displacing the gravity force of the end-effector 315. However, when robot arm 315 picks up or releases a payload, the anchor point 410 of the spring is unlocked and the actuator 405 counterbalances the change in gravity force via spring 415, while the force limiting device 310 counterbalances the weight of end-effector 315. If, for example, the gravity force increases, the heavier load will pull on spring 415 and anchor point 410 will be adjusted by actuator 405 until the elastic force in spring 415 reaches a force equal to load's weight. Then, anchor point 410 is locked again and the robot system 100 goes back to normal operating mode where end-effector 315 and its payload can be displaced vertically in the event of a collision with sufficient contact force to activate force limiting device 310.

Figure 6:
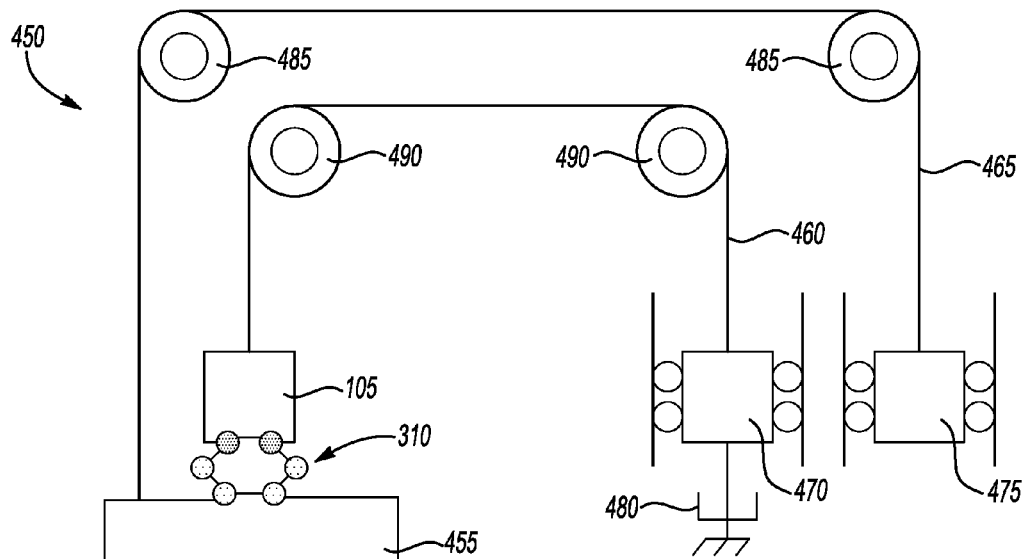
FIG. 6 is a schematic plan view of a counterbalancing system for use with the force limiting device of FIG. 4A.

Referring now to FIG. 6, a counterbalancing system generally indicated at 450 is provided, which uses a passive system of counterweights and/or springs to accomplish the required counterbalancing. The system 450 may be configured using remote counterweights 470, 475, where the balancer and the counterweights are placed away from robot 105, to avoid adding horizontal inertia, and the counterbalancing force is transmitted with cables 460, 465 via routing pulleys 490, 485, respectively, designed in a way that horizontal displacements of robot 105 do not move counterweights 470, 475. This allows the balancing of load 455, which may, for example, be comprised of robot arm 315 and a payload, without adding inertia for displacements in axes other than the vertical one. To configure the counterbalancing system 450 in this manner, the load that needs to be balanced must be separated into two parts, a first load, and a second load 455, by the force limiting device 310. The first load, which is configured to be relatively constant, may include the load represented by robot 105 and device 310. The first load may additionally include the load of an end-effector or robot arm 315 without a payload, in which event pulley 460 would be operatively connected to end-effector 315, also. The second load 455 may include the load of a payload, which may be variable, and may additionally include the load of end-effector or robot arm 315, if this load is not included in the first load. The effectiveness of the force limiting device 310 in an activated condition, e.g., responsive as a force limiting device in the event of a collision, requires that the first and second loads be allowed to move relative to one another when an activating contact force threshold is met. This implies that the second load, which is also the portion of the load which may be variable, must be moved with the same actuator as the first load under normal (non-collision) conditions. It should be noted that in the case where the second load is small compared to the level of force required to accomplish the task, for example, where there is no incremental payload, balancing of the second load is not required and the system can be counterbalanced with a single pulley system, shown in FIG. 6 as including cable 460 and pulleys 490, counterweight 470 and an actuator 480. However, in the general case, a second balancing or cable and pulley system, as shown in FIG. 6 including cable 465 and pulleys 485, will be required to counterbalance the second part of the load 455. This second balancing system adds minimal additional parts and complexity to the overall counterbalance system and robot system 100. The first counterweight 470, used to balance the first load, which is the constant load of the system, is not required to be variable since it always balances substantially the same load, and only one actuator 480 is needed. Therefore, balancing a first and second load separately represents only a limited increase in system complexity.

The particular balancing method employed depends on the particular application and anticipated variability of the loads, and whether the robot system 100 uses a balancing system with counterweights for other purposes, where, for example, the additional complexity of a pulley and counterweight counterbalancing system is minimal and limited to incorporating a second routing-pulley system. As discussed previously, using counterbalancing springs provides a simpler mechanical design that is likely less expensive than using remote counterweights. This is especially true when the load is constant, since for that situation there is no need to add a mechanism or actuator to adjust the balancing force or to change the spring after a certain number of cycles to avoid fatigue. Therefore, determining the most suitable balancing system is dependent on numerous factors that need to be evaluated for each application.

A 3-DOF force limiting device based on Delta architecture, such as mechanism 310 shown in FIGS. 4A and 4B, may be preferably suited for the exemplar scenario provided herein, e.g., as a force limiting device operatively connecting a suspended robot arm to an overhead moving robot, as shown in FIGS. 1A to 1C, to relieve contact force between the robot arm or end-effector 115 and a substantially stationary object 130 in a clamping collision, for a number of reasons. First, the workspace of a force limiting device configured with Delta architecture such as mechanism 310 is the intersection of three toruses and can be optimized to center a large spherical volume on the neutral position, maximizing the available motion in all directions to allow robot 105 to be stopped before reaching the geometric limits of mechanism 310. Second, a force limiting device 310 incorporating Delta architecture can be designed such that the mechanism will be isotropic in its neutral configuration, optimizing the available force that the robot 100 can apply in any direction to accomplish a task while limiting the overall maximum static force to a certain level, which may be a compliant level, to minimize impact on performance. Third, a force limiting device 310 incorporating Delta architecture is sensitive only to forces, not moments, which allows the response of the force limiting device to be independent from the location of the collision contact point on the end-effector. Further, the device configuration based on Delta architecture is geometrically compact and simple, making it potentially less costly and more reliable while limiting its footprint. Notwithstanding the advantages of a Delta based 3-DOF configuration for the force limiting device 310 provided herein, it is understood that other configurations of 3-DOF force limiting devices with may also be provided within the scope of the claimed invention.

While the best modes for carrying out the invention have been described in detail, those familiar with the art to which this invention relates will recognize various alternative designs and embodiments for practicing the invention within the scope of the appended claims.

The invention claimed is:

1. A force limiting device attachable to a moving object and configured to limit a contact force of the moving object with a contacted object, the device comprising:
    a first attachable portion defining a first end of the force limiting device and including an interface configured to fixedly attach the first attachable portion to the moving object;
    a second attachable portion defining a second end of the force limiting device and including an interface connectable to a suspended portion;
    a parallelogram linkage including two legs;
    wherein each leg is rotatably connected to the first attachable portion and to the second attachable portion; and
    a torque limiter including an input shaft in communication with the parallelogram linkage;
    wherein the torque limiter has an activation torque and is configured to be activated from a non-activated state to an activated state when an input torque transmitted through the parallelogram linkage to the input shaft exceeds the activation torque;
    wherein the torque limiter in the non-activated state restrains rotation of the legs relative to the first attachable portion and the second attachable portion to define a fixed orientation between the first attachable portion, the second attachable portion and the legs;
    wherein the torque limiter in the non-activated state prevents movement of the second attachable portion relative to the first attachable portion when the input torque transmitted to the input shaft is less than the activation torque; and
    wherein the torque limiter in the activated state releases the legs to passively rotate relative to the first and second attachable portions to decrease the contact force between the moving object and the contacted object in response to the input torque defined by the contact force transmitted through the force limiting device.

2. The force limiting device of claim 1,
    wherein the moving object has a moving portion and a suspended portion;
    wherein the first attachable portion is fixedly attached to the moving portion and the second attachable portion is attached to the suspended portion;
    wherein the moving portion is configured to move relative to the contacted object; and
    wherein the orientation between the moving portion and the suspended portion of the moving object is defined by fixed orientation between the first attachable portion, the second attachable portion and the legs when the input force defined by the contact force transmitted through one of the suspended portion and the force limiting device is less than the activation force.

3. The force limiting device of claim 2,
    wherein the moving portion is movable by a support system; and
    wherein the moving portion includes a braking mechanism configured such that movement of the moving portion by the support system is stopped by the braking mechanism when the input torque exceeds the activation torque.

4. The force limiting device of claim 2, further comprising:
    a contact point defined by the location of contact between the contacted object and one of the suspended portion and the force limiting device at a distance from the input shaft;
    wherein the contact force is transmitted between the one of the suspended portion and the force limiting device and the contacted object through the contact point and defines the input torque inputted to the input shaft;
    wherein the
    parallelogram linkage is configured to transmit the input torque to the input shaft of the torque limiter such that the magnitude of the input torque defined by the contact force is independent of the distance between the input shaft and the contact point.

5. The force limiting device of claim 1,
    wherein the one or more parallelogram linkages includes a first parallelogram linkage and a second parallelogram linkage; and
    wherein the first parallelogram linkage is perpendicular to the second parallelogram linkage.

6. The force limiting device of claim 1,
    wherein the one or more parallelogram linkages includes at least three parallelogram linkages; and
    wherein the at least three parallelogram linkages are arranged in a Delta configuration.

7. The force limiting device of claim 6, further comprising a gravity compensating mechanism.

8. The force limiting device of claim 7, wherein the gravity compensating mechanism includes at least one of a spring and a counterbalance.

9. A robot system configured to be movably attached to an overhead suspension, the robot system comprising:
    a robot configured to be movable relative to the overhead suspension;
    a suspended portion movable by the robot toward an object;

a force limiting device fixedly attached at a first end to the robot and at a second end to the suspended portion;
the force limiting device activatable at an activation level; wherein:
  the force limiting device includes a parallelogram linkage rotatably attached to the first end and the second end of the force limiting device;
  the parallelogram linkage is activatable from a non-compliant state to a compliant state by activation of the force limiting device;
  the parallelogram linkage in the non-compliant state is fixed in a first position relative to the robot and the suspended portion to rigidly attach the robot to the suspended portion;
  the parallelogram linkage in the compliant state is passively moveable from the first position to a second position such that in the second position the suspended portion is compliantly attached to the robot by the force limiting device;
wherein the suspended portion is configured to exert a contact force against the object when the suspended portion is moved into contact with the object
and upon contact immediately transmit an activation force opposing the contact force to the force limiting device;
wherein the force limiting device is configured to prevent movement of the parallelogram linkage from the first position when the activation force is less than the activation level;
wherein the force limiting device is activated when the activation force transmitted to the force limiting device exceeds the activation level; and
wherein the force limiting device when activated activates the parallelogram linkage from the non-compliant state to the compliant state to decrease the contact force exerted against the object by the suspended portion.

10. The robot system of claim 9, further comprising:
a braking mechanism configured to stop movement of the robot relative to the overhead suspension when the activation force exceeds the activation level.

11. The robot system of claim 9, further comprising:
two parallelogram linkages including a first parallelogram linkage and a second parallelogram linkage; and
wherein the first parallelogram linkage is perpendicular to the second parallelogram linkage.

12. The robot system of claim 9, further comprising:
at least three parallelogram linkages; and
wherein the at least three parallelogram linkages are arranged in a Delta architecture.

13. The robot system of claim 12, wherein the system suspended overhead includes a payload; and further comprising:
a gravity compensating mechanism;
wherein the gravity compensating mechanism counteracts the weight of at least one of the suspended portion and the payload.

14. The robot system of claim 13, wherein the gravity compensating mechanism includes at least one of a spring and a counterbalance.

* * * * *